US010670297B2

(12) United States Patent
McMahon

(10) Patent No.: US 10,670,297 B2
(45) Date of Patent: *Jun. 2, 2020

(54) ROOFTOP EXHAUST COLLECTORS AND POWER GENERATORS, AND ASSOCIATED SYSTEMS AND METHODS

(71) Applicant: Primo Wind, Inc., San Diego, CA (US)

(72) Inventor: Edward McMahon, San Diego, CA (US)

(73) Assignee: Primo Energy, Inc., San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/045,478

(22) Filed: Jul. 25, 2018

(65) Prior Publication Data

US 2018/0328616 A1 Nov. 15, 2018

Related U.S. Application Data

(63) Continuation of application No. 15/366,969, filed on Dec. 1, 2016, now Pat. No. 10,060,647, which is a
(Continued)

(51) Int. Cl.
*F03B 13/00* (2006.01)
*H02P 9/04* (2006.01)
(Continued)

(52) U.S. Cl.
CPC ........... *F24F 12/00* (2013.01); *F24F 7/02* (2013.01); *H02K 7/183* (2013.01); *H02K 7/1823* (2013.01);
(Continued)

(58) Field of Classification Search
CPC ................. F24F 12/00; H02K 7/1823
See application file for complete search history.

(56) References Cited

U.S. PATENT DOCUMENTS 2,240,664 A * 5/1941 Moore ............... H02K 9/06
290/1 R
2,668,686 A * 2/1954 Thomas ............ F03B 11/02
239/553.5
(Continued)

FOREIGN PATENT DOCUMENTS

| CN | 203560041 | 4/2014 |
| WO | 2006007696 | 1/2006 |
| WO | 2011035415 | 3/2011 |

OTHER PUBLICATIONS

Tong, C.W. et al., Exhaust Air and Wind Energy Recovery System for Clean Energy Generation, 2011 International Conference on Environment and Industrial Innovation, 2011, pp. 45-49, vol. 12, IACSIT Press, Singapore.
(Continued)

*Primary Examiner* — Tulsidas C Patel
*Assistant Examiner* — Thomas K Quigley
(74) *Attorney, Agent, or Firm* — Perkins Coie LLP

(57) ABSTRACT

An electrical energy generation system can include a housing, an electrical generator supported by the housing, a turbine operatively connected to the electrical generator, and a hollow frustum positioned in the housing and spaced apart from the turbine. The frustum can be configured to receive airflow via a lower opening and to direct the airflow toward the turbine with increased velocity. Another electrical energy generation system can include an electrical generator, a turbine operatively connected to the electrical generator, and an enclosed passageway configured to increase a speed of an airflow from an artificial source toward the turbine. The enclosed passageway can be positioned to support the turbine. The systems can include one or more baffle elements to straighten the airflow along a direction aligned with a rotational axis of the turbine. Electrical energy generation
(Continued)

systems harvest waste or exhaust air from rooftop vent or fan assemblies.

10 Claims, 10 Drawing Sheets

Related U.S. Application Data continuation-in-part of application No. 29/542,773, filed on Oct. 16, 2015, now Pat. No. Des. 808,000.

(51) Int. Cl.
  *F24F 12/00* (2006.01)
  *H02K 7/18* (2006.01)
  *F24F 7/02* (2006.01)
  *F03D 1/04* (2006.01)

(52) U.S. Cl.
  CPC .......... *F03D 1/04* (2013.01); *F05B 2220/602* (2013.01); *F05B 2220/604* (2013.01); *F05B 2240/213* (2013.01); *F24F 2203/1004* (2013.01)

(56) References Cited

U.S. PATENT DOCUMENTS

| | | | |
|---|---|---|---|
| 3,339,078 A | 8/1967 | Crompton | |
| 3,374,849 A * | 3/1968 | Redman | B60K 16/00 180/2.2 |
| 3,740,565 A | 6/1973 | Wesley | |
| 3,883,750 A | 5/1975 | Uzzell, Jr. | |
| 4,012,163 A | 3/1977 | Baumgartner et al. | |
| 4,021,135 A * | 5/1977 | Pedersen | F03D 1/04 415/208.2 |
| 4,079,264 A * | 3/1978 | Cohen | F03D 1/04 290/55 |
| 4,088,419 A | 5/1978 | Hope et al. | |
| 4,116,269 A * | 9/1978 | Ikeda | F01P 3/18 123/41.49 |
| 4,134,469 A | 1/1979 | Davis | |
| 4,140,433 A | 2/1979 | Eckel | |
| 4,159,426 A * | 6/1979 | Staton | H02K 53/00 290/44 |
| 4,163,904 A | 8/1979 | Skendrovic | |
| 4,182,594 A * | 1/1980 | Harper | F03D 1/04 415/208.1 |
| 4,218,175 A | 8/1980 | Carpenter | |
| 4,254,843 A | 3/1981 | Han et al. | |
| 4,258,271 A * | 3/1981 | Chappell | F03B 13/10 290/54 |
| 4,276,482 A * | 6/1981 | Crockett | F03B 13/10 290/52 |
| 4,379,236 A * | 4/1983 | Inoue | F03D 1/04 290/55 |
| 4,411,588 A | 10/1983 | Currah, Jr. | |
| 4,415,306 A | 11/1983 | Cobden | |
| 4,424,452 A | 1/1984 | Francis | |
| 4,524,285 A | 6/1985 | Rauch | |
| 4,600,360 A | 7/1986 | Quarterman | |
| 4,660,390 A * | 4/1987 | Worthington | F24F 5/0035 62/309 |
| 4,757,800 A * | 7/1988 | Shei | A21B 1/245 126/21 A |
| 4,781,522 A | 11/1988 | Wolfrrun | |
| 4,868,408 A | 9/1989 | Hesh | |
| 4,890,976 A | 1/1990 | Jansson | |
| 5,280,827 A | 1/1994 | Taylor et al. | |
| 5,368,258 A | 11/1994 | Johnson et al. | |
| 5,375,968 A | 12/1994 | Kollitz et al. | |
| 5,381,048 A | 1/1995 | Baird | |
| 5,512,788 A | 4/1996 | Berenda et al. | |
| 5,799,680 A | 9/1998 | Dorflinger | |
| 5,982,046 A * | 11/1999 | Minh | F03D 1/04 290/55 |
| 6,132,181 A | 10/2000 | McCabe | |
| 6,246,126 B1 * | 6/2001 | Van Der Veken | F03D 1/04 290/55 |
| 6,365,985 B1 | 4/2002 | Cohen | |
| 6,448,669 B1 | 9/2002 | Elder | |
| 6,506,109 B1 * | 1/2003 | Bastian | B08B 15/023 454/56 |
| 6,710,468 B1 * | 3/2004 | Marrero O'Shanahan | F03D 1/04 290/55 |
| 7,091,628 B1 * | 8/2006 | Balt | F03B 17/00 290/43 |
| 7,112,034 B2 | 9/2006 | Bezemer | |
| 7,172,386 B2 * | 2/2007 | Truong | F03G 6/001 415/4.1 |
| 7,208,846 B2 * | 4/2007 | Liang | F03D 9/00 290/1 R |
| 7,276,809 B2 | 10/2007 | Zambrano et al. | |
| D558,669 S | 1/2008 | Jeamvigite | |
| 7,315,093 B2 | 1/2008 | Graham, Sr. | |
| 7,354,245 B2 | 4/2008 | Baba | |
| 7,380,751 B1 | 6/2008 | Henson | |
| 7,538,447 B1 * | 5/2009 | Berenda | F03D 1/04 290/55 |
| 7,675,188 B2 | 3/2010 | Baarman | |
| 7,834,477 B2 * | 11/2010 | Sheikhrezai | F03D 3/04 290/55 |
| 7,878,236 B1 * | 2/2011 | Breen | F24F 11/008 165/288 |
| 7,994,652 B2 | 8/2011 | Grabau et al. | |
| 7,999,407 B2 * | 8/2011 | Saluccio | F03D 9/00 290/54 |
| 8,013,465 B2 * | 9/2011 | Gilbert | F03D 1/04 290/55 |
| 8,087,980 B2 * | 1/2012 | Palmer | A61L 9/20 454/255 |
| D659,257 S | 5/2012 | Desberg | |
| 8,183,709 B1 | 5/2012 | Manning | |
| 8,253,267 B2 | 8/2012 | Gilbert | |
| D670,985 S | 11/2012 | Tompkin | |
| 8,338,974 B2 | 12/2012 | Nyffenegger | |
| 8,564,148 B1 * | 10/2013 | Novak | H02K 7/183 290/52 |
| D699,336 S | 2/2014 | Girard | |
| 8,664,781 B2 | 3/2014 | Alvi | |
| 8,759,997 B2 * | 6/2014 | Gilbert | F03D 1/04 290/55 |
| 8,814,493 B1 * | 8/2014 | Komp | F03D 1/04 415/1 |
| 8,952,557 B2 | 2/2015 | Farrell | |
| 8,963,359 B2 * | 2/2015 | Evans | F01D 15/10 290/54 |
| 9,018,791 B2 * | 4/2015 | Guo | F03D 1/04 290/55 |
| 9,041,238 B2 | 5/2015 | McMahon | |
| 9,097,241 B1 * | 8/2015 | Hollick | F03G 6/045 |
| 9,103,320 B1 * | 8/2015 | Potts | F03D 80/60 |
| 9,151,512 B2 | 10/2015 | Lipinski | |
| 9,353,994 B1 * | 5/2016 | Allison, III | F24F 13/02 |
| 9,932,959 B2 * | 4/2018 | Al-Shibl | F03D 1/04 |
| 2002/0040555 A1 | 4/2002 | Banks et al. | |
| 2004/0061337 A1 | 4/2004 | Becker | |
| 2005/0006904 A1 | 1/2005 | Bayer | |
| 2005/0242590 A1 | 11/2005 | Zambrano et al. | |
| 2006/0108809 A1 | 5/2006 | Sealzi | |
| 2007/0018462 A1 | 1/2007 | Richards et al. | |
| 2007/0036648 A1 * | 2/2007 | Obosu | F04D 29/545 415/222 |
| 2007/0252391 A1 | 11/2007 | Chen | |
| 2008/0067813 A1 * | 3/2008 | Baarman | C02F 1/325 290/43 |
| 2008/0093861 A1 | 4/2008 | Friesth et al. | |
| 2008/0303287 A1 | 12/2008 | Meheen | |
| 2009/0066090 A1 | 3/2009 | Boone | |
| 2009/0087301 A1 * | 4/2009 | Krouse | F03B 3/18 415/4.3 |
| 2009/0095867 A1 | 4/2009 | Oh et al. | |

(56) References Cited

U.S. PATENT DOCUMENTS

| | | |
|---|---|---|
| 2009/0191057 A1 | 7/2009 | Knutson |
| 2009/0206611 A1 | 8/2009 | Gilbert |
| 2009/0229796 A1* | 9/2009 | Williams .................. F25B 9/08 165/121 |
| 2010/0060012 A1* | 3/2010 | Reitz ........................ F03D 1/04 290/55 |
| 2010/0090605 A1 | 4/2010 | Nevins |
| 2010/0126086 A1 | 5/2010 | Paggi |
| 2010/0207389 A1 | 8/2010 | Nyffenegger |
| 2010/0244455 A1 | 9/2010 | Berginc |
| 2011/0031043 A1 | 2/2011 | Armani et al. |
| 2011/0033288 A1* | 2/2011 | Pezaris .................... F03D 3/02 415/208.1 |
| 2011/0089701 A1* | 4/2011 | Blake ...................... F03D 3/002 290/55 |
| 2011/0266802 A1 | 11/2011 | Rehman Alvi |
| 2011/0293419 A1 | 12/2011 | Koya et al. |
| 2011/0309723 A1 | 12/2011 | Lu et al. |
| 2012/0038161 A1* | 2/2012 | Outhred .................. F03B 13/10 290/50 |
| 2012/0043761 A1 | 2/2012 | White |
| 2012/0091710 A1 | 4/2012 | Evans et al. |
| 2012/0104759 A1* | 5/2012 | Ricker ...................... F03D 3/02 290/44 |
| 2012/0175882 A1 | 7/2012 | Sterling et al. |
| 2012/0280503 A1 | 11/2012 | Mahawili |
| 2013/0000328 A1* | 1/2013 | Levy ........................ F25B 9/004 62/87 |
| 2013/0011239 A1* | 1/2013 | Khalitov ................. F04D 17/06 415/119 |
| 2013/0127393 A1* | 5/2013 | Garcia .................... F03D 3/002 320/101 |
| 2014/0010631 A1* | 1/2014 | Khedekar ............... F02B 33/00 415/110 |
| 2014/0092613 A1 | 4/2014 | Maeda et al. |
| 2014/0271133 A1* | 9/2014 | Cocks ................... F04D 29/667 415/119 |
| 2017/0108238 A1 | 4/2017 | McMahon |

OTHER PUBLICATIONS

Chapter 3 Rotational Flows: Circulation and Turbulence, available at https://web.archive.org/web/20150922030158/http:/maxwell.ucdavis.edu/~cole/phy9b/notes/fluids_ch3.pdf.

Singh, T., SheerWind's INVELOX Wind Turbine Can Generate 600% More Energy Than Conventional Turbines, Inhabitat, available at http://inhabitat.com/sheerwinds-invelox-wind-turbine-can-generate-600-more-energy-than-conventional-turbines/.

Extended European Search Report dated Apr. 6, 2018 for European Application No. 15863968.2 (10 pages).

Examination Report dated Sep. 19, 2019 in European Patent Application No. 17204920.7, 5 pages.

* cited by examiner

ROOFTOP EXHAUST COLLECTORS AND POWER GENERATORS, AND ASSOCIATED SYSTEMS AND METHODS

CROSS-REFERENCE TO RELATED APPLICATION(S)

The present application is a continuation of U.S. patent application Ser. No. 15/366,969, entitled "Rooftop Exhaust Collectors and Power Generators, and Associated Systems and Methods", filed on Dec. 1, 2016, which further claims priority to U.S. Design patent application No. 29/542,773, entitled "Exhaust Fan Recapture Generator", filed Oct. 16, 2015, each of which is incorporated herein in its entirety by reference.

TECHNICAL FIELD

The present technology is directed generally to rooftop exhaust collectors and power generators, and associated systems and methods.

BACKGROUND

Many buildings and structures, such as high-rise office buildings, apartment buildings, schools, factories, hospitals, subway stations, and other commercial, industrial, residential, or other kinds of buildings or structures have ventilation systems to exhaust air for a variety of reasons. For example, high-rise buildings often have rooftop exhaust fans or rooftop vents to remove stale air from inside the building as part of an air conditioning system or for other reasons. Some buildings have cooling towers that blow air outwardly and/or upwardly to remove air from a variety of systems. Many such fans or vents are operating continuously, such that air is flowing out of the building on a nearly continual basis. Such airflow can be considered wasted because it merely vents into the atmosphere.

Modern society desires increased reliance upon alternative energy sources, such as wind power. There is also a desire for microgrid energy arrangements and energy independence. For example, buildings or communities that produce and store their own electrical power are desirable.

SUMMARY

The following summary is provided for the convenience of the reader and identifies several representative embodiments of the disclosed technology. Such representative embodiments are examples only and do not constitute the full scope of the invention.

Representative embodiments of the present technology include an electrical energy generation system having a housing with an upper portion and a lower portion, the lower portion being positioned opposite the upper portion; an electrical generator supported by the housing; a turbine operatively connected to the electrical generator; and a hollow frustum positioned in the housing and spaced apart from the turbine, the frustum having an upper base portion with an upper opening, and a lower base portion having a lower opening, the lower opening being larger than the upper opening, and the lower opening being positioned closer to the lower portion of the housing than to the upper portion of the housing. In a representative embodiment, the frustum is configured to receive airflow via the lower opening and to direct the airflow toward the turbine.

In some embodiments, the electrical energy generation system further includes a baffle element configured to straighten the airflow along a direction aligned with a rotational axis of the turbine. In some embodiments, the baffle element is positioned in a hollow cap element connected to the upper base portion of the frustum. In some embodiments, the baffle element is a first baffle element and the system further includes a second baffle element positioned in the hollow cap element and spaced apart from the first baffle element. In some embodiments, the baffle element includes a plurality of strip elements. In some embodiments, the baffle element includes a plurality of parallel channels.

In some embodiments, the frustum is or includes a conical frustum. In some embodiments, the frustum has a rectangular cross-section.

In some embodiments, the turbine includes a plurality of blade elements connected to a hub element, wherein each blade element of the plurality of blade elements is positioned to at least partially overlap another blade element of the plurality of blade elements.

In some embodiments, an electrical energy generation system according to the present technology further includes a diverging element configured to cause the airflow to diverge between the upper base portion of the frustum and the turbine to direct the airflow toward an outer annular region of the turbine.

In some embodiments, an electrical energy generation system according to the present technology includes a relief vent positioned to open and close an airway between an interior of the housing and an exterior of the housing.

An electrical energy generation system according to a representative embodiment of the present technology further includes an artificial airflow source, the artificial airflow source having at least one of an exhaust fan, an exhaust vent, or a chimney.

In a particular representative embodiment of an electrical energy generation system, the system includes a first baffle element configured to straighten the airflow along a direction aligned with a rotational axis of the turbine, the baffle element being positioned in a hollow cap element connected to the upper base portion of the frustum; a second baffle element positioned in the hollow cap element and spaced apart from the first baffle element; a relief vent positioned to open and close an airway between an interior of the housing and an exterior of the housing; and a control system configured to cause the relief vent to open or close based on a pressure differential between the interior of the housing and the exterior of the housing. The frustum is or includes a conical frustum and the turbine includes a plurality of blade elements connected to a hub element. Each blade element of the plurality of blade elements is positioned to at least partially overlap another blade element of the plurality of blade elements. In a particular representative embodiment, at least one of the first baffle element or the second baffle element includes a plurality of strip elements.

Other representative embodiments of the present technology include an electrical energy generation system having an electrical generator, a turbine operatively connected to the electrical generator, and an enclosed passageway configured to increase a speed of an airflow from an artificial source toward the turbine. In a representative embodiment, the enclosed passageway is positioned to support the turbine.

In some embodiments, the enclosed passageway includes a frustum configured to converge airflow from the source toward the turbine. In some embodiments, the system further includes a baffle element configured to direct an airflow toward the turbine and to straighten a pathway of the airflow. In a particular embodiment, the turbine can be or include a Savonius wind turbine.

Other representative embodiments of the present technology include a method for generating electricity including receiving an artificial airflow stream, directing the airflow stream through a converging channel configured to increase a velocity of the airflow stream, increasing the velocity of the airflow stream using the converging channel, straightening the airflow stream using a baffle element, directing the airflow stream toward a turbine to cause the turbine to spin, transferring a rotational force from the turbine to an electrical generator, and generating electricity using the electrical generator. In some embodiments, directing the airflow stream toward a turbine includes directing the airflow stream within a housing configured to contain the converging channel and the baffle element. In some embodiments, the method further includes regulating a backpressure within the housing, wherein regulating the backpressure includes opening or closing an airway operatively connected between an interior of the housing and an exterior of the housing.

Other features and advantages will appear hereinafter. The features described above may be used separately or together, or in various combinations of one or more of them.

BRIEF DESCRIPTION OF THE DRAWINGS

In the drawings, wherein the same reference number indicates the same element throughout the views.

DETAILED DESCRIPTION

The present technology is directed to rooftop exhaust collectors and power generators, and associated systems and methods. Various embodiments of the technology will now be described. The following description provides specific details for a thorough understanding and an enabling description of these embodiments. One skilled in the art will understand, however, that the invention may be practiced without many of these details. Additionally, some well-known structures or functions may not be shown or described in detail so as to avoid unnecessarily obscuring the relevant description of the various embodiments. Accordingly, the technology may include other embodiments with additional elements or without several of the elements described below with reference to FIGS. 1-10, which illustrate examples of the technology.

The terminology used in the description presented below is intended to be interpreted in its broadest reasonable manner, even though it is being used in conjunction with a detailed description of certain specific embodiments of the technology. Certain terms may even be emphasized below; however, any terminology intended to be interpreted in any restricted manner will be overtly and specifically defined as such in this detailed description section.

Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all of the items in the list, or (c) any combination of items in the list. Further, unless otherwise specified, terms such as "attached" or "connected" are intended to include integral connections, as well as connections between physically separate components.

Specific details of several embodiments of the present technology are described herein with reference to large-scale rooftop ventilation or exhaust systems. The technology may also be used in smaller applications, such as for residential air conditioning units, boating or nautical exhaust units, or other vehicular applications. Conventional aspects of turbines and generators may be described in reduced detail herein for efficiency and to avoid obscuring the present disclosure of the technology.

Figure 1:
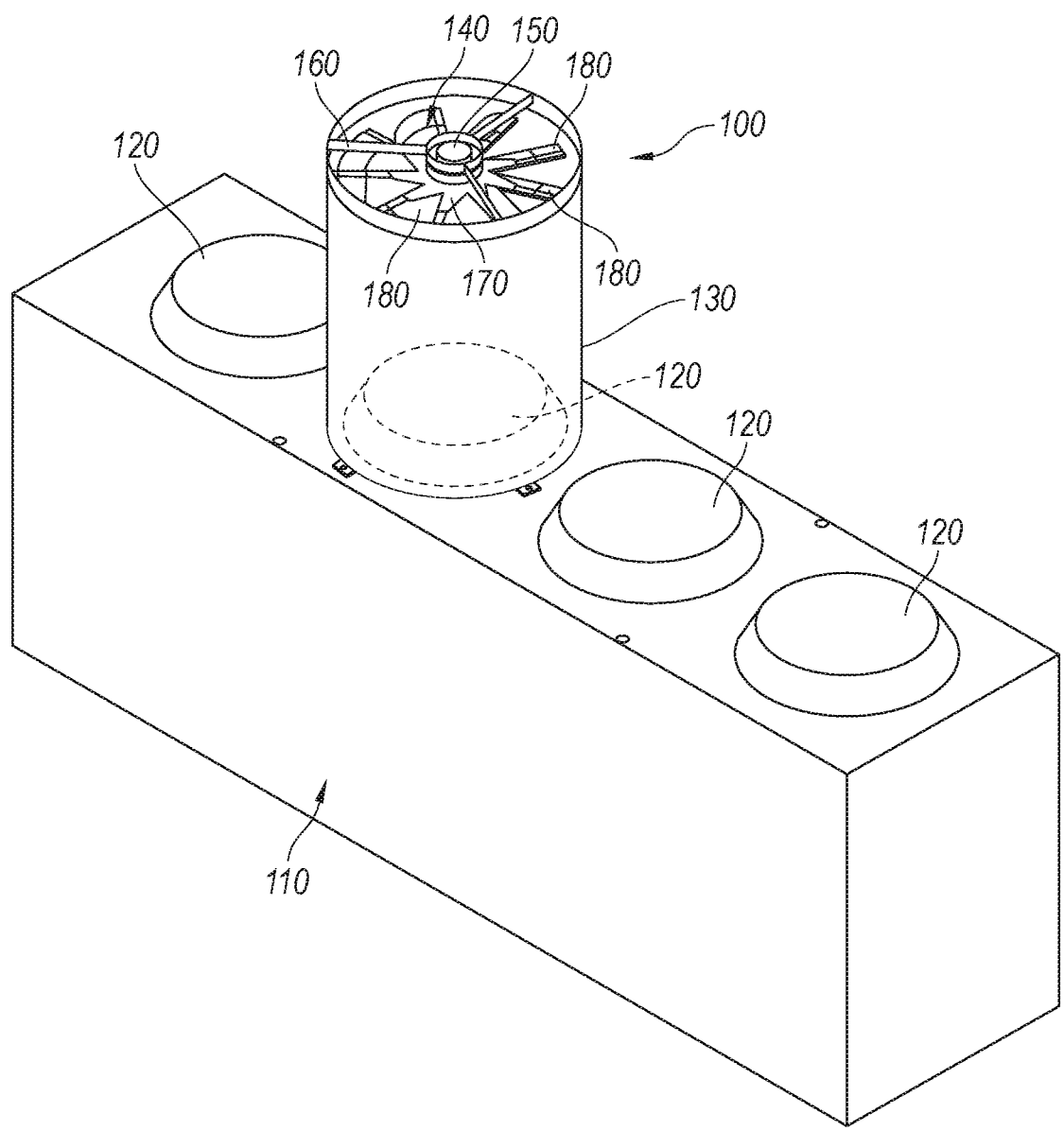
FIG. 1 illustrates a view of a rooftop exhaust collector and electrical energy generator assembly positioned on a rooftop exhaust vent assembly in accordance with a representative embodiment of the present technology.

FIG. 1 illustrates a view of a rooftop exhaust collector and electrical energy generator assembly 100 positioned on a rooftop exhaust vent assembly 110 in accordance with a representative embodiment of the present technology. The rooftop exhaust vent assembly 110 may be positioned on a rooftop to allow or to cause air to flow out of a building or other structure into the atmosphere. Such a rooftop exhaust vent assembly 110 may include one or more exhaust fans 120. For example, the present technology can be used with a bank or array of exhaust fans 120 or with a single exhaust fan 120. Note that although the exhaust fans 120 are illustrated as being part of the rooftop exhaust vent assembly 110, such exhaust fans may be positioned elsewhere (such as inside the building) and the rooftop exhaust vent assembly 110 may function as a duct to connect the airflow to the atmosphere.

The rooftop exhaust collector and electrical energy generator assembly 100 (also referred to hereafter for convenience as a rooftop exhaust collector 100) can form part of an electrical energy generation system. The rooftop exhaust collector 100 can be mounted on or positioned over one or more of the exhaust fans 120 or exhaust vents in the rooftop exhaust vent assembly 110 to receive air exiting the rooftop exhaust vent assembly 110. Only one rooftop exhaust collector 100 is illustrated in FIG. 1 (covering one of the exhaust fans 120 or exhaust vents), but any suitable number of rooftop exhaust collectors 100 can be used at once.

The rooftop exhaust collector 100 includes an external shell or housing 130 that contains and/or supports a turbine 140 that drives an electrical energy generator 150. The turbine 140 and generator 150 can be supported by a support structure 160 mounted on or within the housing 130. In a representative embodiment, the housing 130 can be cylindrical, while in other embodiments, the housing 130 can have other shapes, such as conical, rectangular, square, or other suitable shapes. In a representative embodiment, the housing 130 can have a height of 45.5 inches, an outer diameter of 36.58 inches, a wall thickness of 0.04 inches, or other suitable dimensions. The exact shape or size of the housing 130 can be dependent upon the size of the airflow source (for example, an exhaust fan 120). The turbine 140 can include a hub 170 that carries one or more blade elements 180. The blade elements 180 have suitable shapes for converting airflow into rotational force at the generator 150. For example, the upward airflow from the exhaust fans 120 or other vents causes the turbine 140 to drive the generator 150 to create electrical energy. The generator 150 can be a rotary electricity generator, a dynamo, a magneto, an alternator, or another suitable device for converting rotational force into electrical energy.

Figure 2:
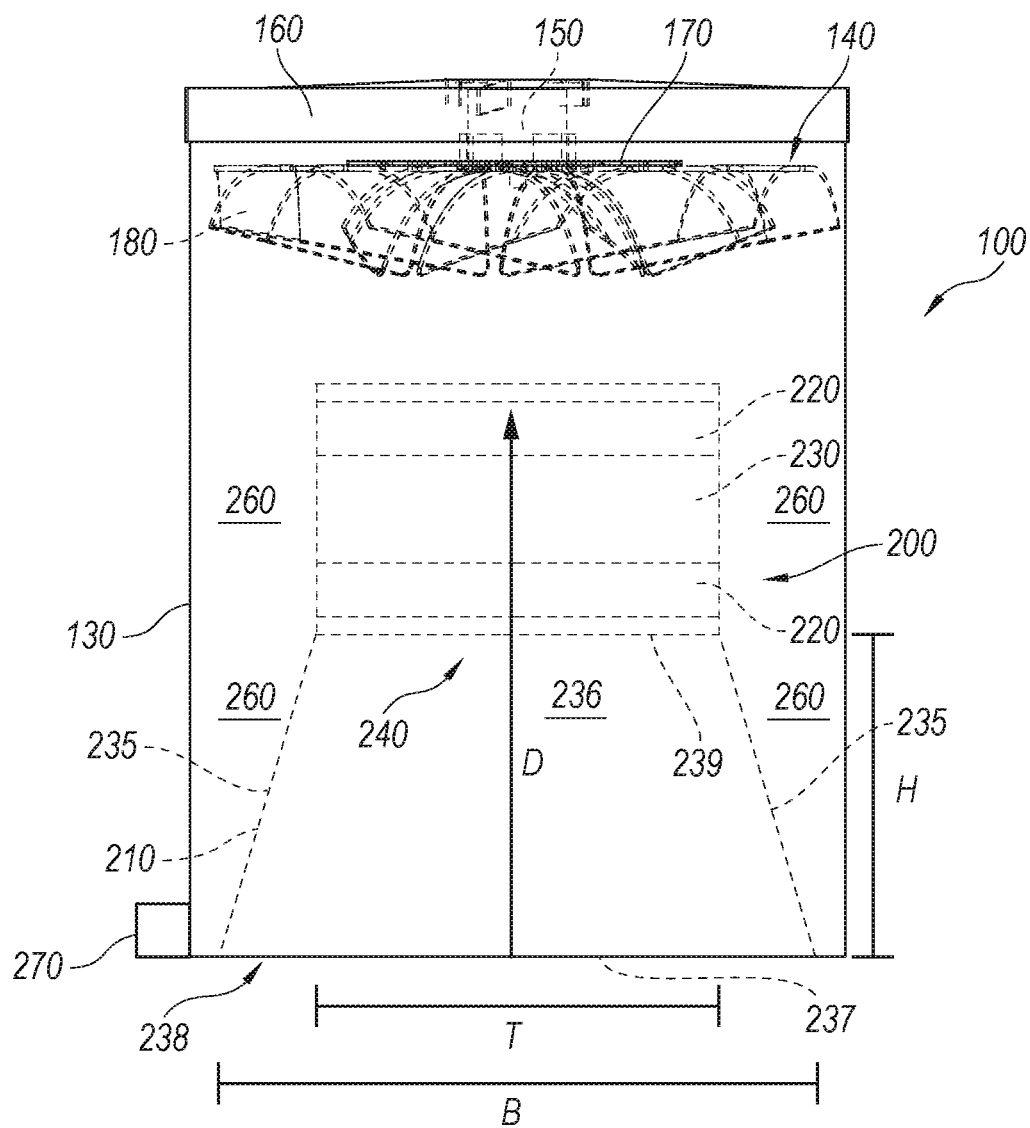
FIG. 2 illustrates a side cutaway view of the rooftop exhaust collector and electrical energy generator assembly shown in FIG. 1, in accordance with a representative embodiment of the present technology.

FIG. 2 illustrates a side cutaway view of the rooftop exhaust collector and electrical energy generator assembly 100 shown in FIG. 1, in accordance with a representative embodiment of the present technology. A flow control assembly 200 is positioned to direct airflow along direction d toward the turbine 140. In a representative embodiment, the flow control assembly 200 increases the speed of incoming airflow (such as from one or more exhaust fans 120, FIG. 1) using an enclosed passageway which can be in the form of a Venturi element 210. Optionally, the airflow is then straightened using one or more baffle elements 220 (for example, two baffle elements 220) positioned in or attached to a cone cap 230 of the flow control assembly 200. In a representative embodiment, the cone cap 230 can have an outer diameter of 22.58 inches, a height of 14 inches, and a wall thickness of 0.04 inches, or it may have other suitable dimensions.

A representative Venturi element 210 in accordance with an embodiment of the present technology may be in the form of a hollow (optionally, rounded) frustum formed at least in part by a sidewall 235 enclosing a volume 236 within the Venturi element 210. The Venturi element 210 can include a lower opening 237 in a lower base portion 238 for receiving incoming airflow from the airflow source and an upper opening 239 in an upper base portion 240 for passing airflow to the cone cap 230 and the baffle elements 220. The lower opening 237 can have a diameter B and the upper opening 239 can have a diameter T which is smaller than the lower opening diameter B. A height H represents the distance between the lower opening 237 and the upper opening 239. In a representative embodiment, the lower base portion 238 can have a maximum outer diameter of 34 inches, the upper base portion 240 can have a maximum outer diameter of 22.5 inches (approximating the outer diameter of the cone cap 230), and the height H can be 18 inches. The sidewall 235 of the Venturi element 210 can have a thickness of approximately 0.038 inches. In some embodiments, dimensions of the rooftop exhaust collector and electrical energy generator assembly 100 can maintain ratios relative to each other when scaling the size of the assembly 100 up or down for various applications. Accordingly, for example, the Venturi element 210 can have other suitable dimensions, in part dependent upon the size of the airflow source.

The Venturi element 210 is suitably shaped and sized to increase the velocity of the airflow between the airflow source and the turbine 140 based at least in part upon the Bernoulli Principle and the Venturi Effect known to those of ordinary skill in the art of fluid dynamics and engineering. For example, using the associated principle of conservation of mass, and simplifying for convenience, the velocity $V_2$ of air exiting the Venturi element 210 can be calculated according to the formula $A_1V_1=A_2V_2$, where $A_1$ and $A_2$ are the cross-sectional area of the lower opening 237 and the upper opening 239, respectively, and $V_1$ is the incoming air velocity.

Although the term "frustum" is used herein to describe the Venturi element 210, the term "frustum" can include a right frustum, a square frustum (i.e. a frustum with a square and/or rectangular cross-section), a truncated cone, a converging cylinder (for example, a tubular structure with a wider opening at one end than another), structures having contoured and/or converging walls, a nozzle, or other similar shapes suitable for increasing a speed of airflow according to scientific principles. Accordingly, the Venturi element 210 can include several suitable shapes.

In operation, the lower base portion 238 of the Venturi element 210 receives an airflow or moving air stream into its lower opening 237. As the airstream moves upward along direction D, it increases in speed. It exits the Venturi element 210 from the upper opening 239 in the upper base portion 240 and flows into the cone cap 230. If the airflow includes any residual rotation or turbulence (for example, as a result of rotational forces and turbulence imparted to the airflow from an exhaust fan 120), the one or more baffle elements 220 straighten the air before it passes to the turbine 140. The airflow then causes the turbine 140 to rotate the generator 150 or a portion of the generator 150 to transform the energy in the airflow to electrical energy. In a representative embodiment, the turbine 140 may be a center-focused turbine (described below with respect to FIG. 3, for example), in which the airflow induces more torque in the turbine 140 in a region near a rotational axis of the turbine 140 than in a radially outward region of the turbine 140. In other embodiments, however, the turbine 140 can be any suitable turbine for converting airflow to rotational energy, including, for example, a whirlybird turbine, a propeller-like turbine, or other suitable turbines.

Depending on the incoming mass flow of air and the inertial and/or frictional properties of the turbine 140, for example, backpressure and turbulence may form inside the housing 130 under certain conditions, which can reduce efficiency of the rooftop exhaust collector 100 or increase the resistance against an exhaust fan (such as the fan 120 in FIG. 1), thereby increasing its power consumption. The inventor discovered that a sufficiently large backpressure region 260 within the housing 130 (between the housing 130 and interior components such as the flow control assembly 200) can dispel some such pressure and turbulence. In some embodiments, a backpressure relief vent 270 can optionally be included to reduce backpressure. In some embodiments, a control system operates the vent 270 based on data from one or more pressure sensors inside the housing 130, data regarding malfunctions, data requirements of the microgrid or other energy network, and/or sensors that measure the power consumed by the exhaust fan. For example, if the exhaust fan (120) begins requiring power above a predetermined threshold, the vent 270 can be programmed to open to reduce the pressure inside the housing 130. Or, if the rooftop exhaust collector 100 fails and creates a malfunction code, the vent 270 can be programmed to stay open to avoid unnecessary load on the exhaust fan (120). The inventor discovered that the rooftop exhaust collector 100 collects rooftop exhaust airflow and converts the airflow into electrical energy using the generator 150 without unduly inducing a strain on the exhaust fan 120, resulting in a net positive recapture of energy that would otherwise be lost to the atmosphere.

Figure 3:
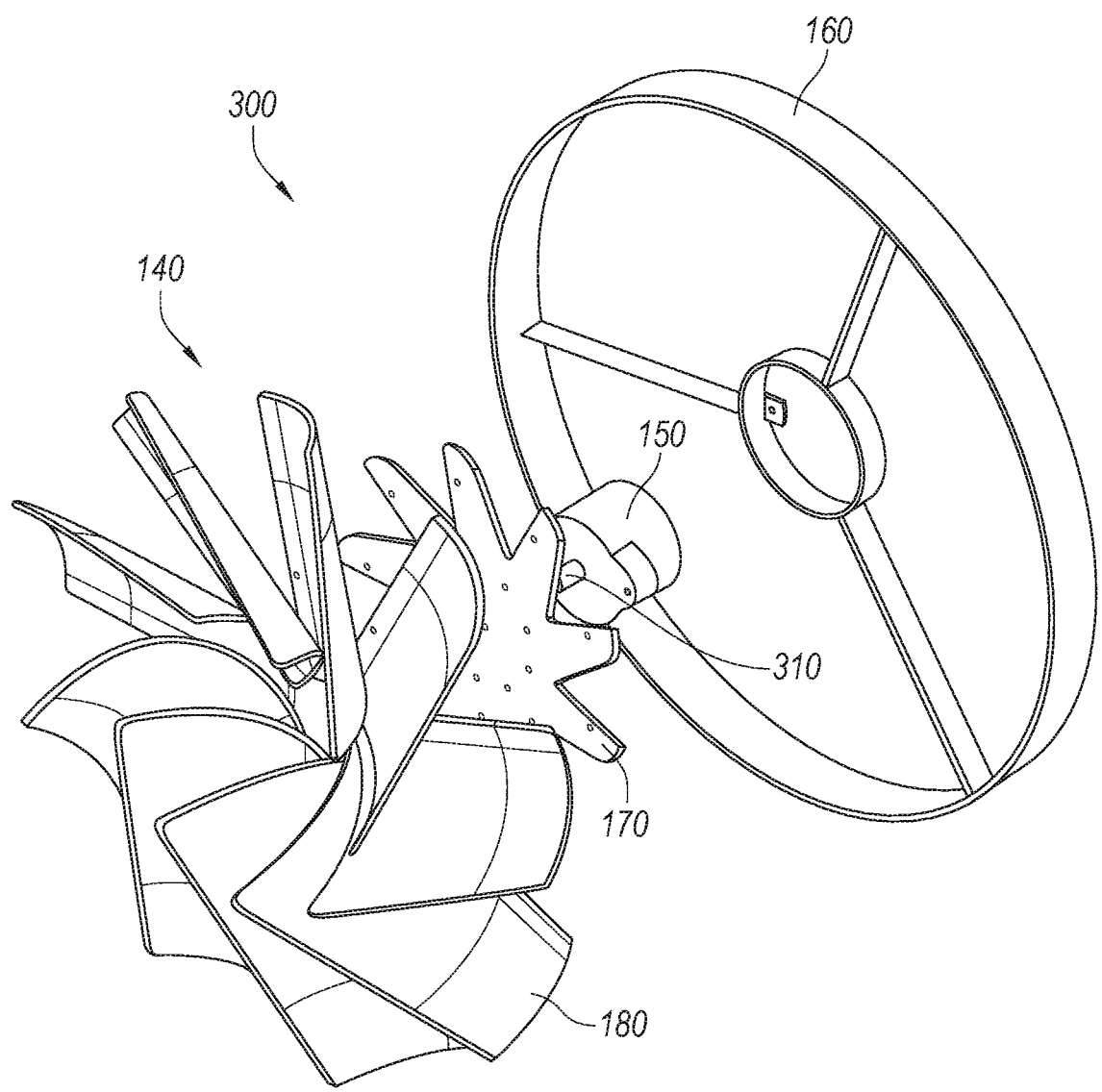
FIG. 3 illustrates an exploded view of an upper assembly portion (including a turbine, generator, and supporting structure) of the rooftop exhaust collector and electrical energy generator assembly shown in FIG. 1.

FIG. 3 illustrates a view of an upper assembly portion 300 of the rooftop exhaust collector and electrical energy generator assembly 100 shown in FIG. 1. The upper assembly portion 300 can include the support structure 160 (attached to the housing 130 as shown in FIGS. 1 and 2), which can support the generator 150 and the turbine 140. The turbine 140 can include the one or more blade elements 180 attached to the hub 170. For example, there may be nine blade elements 180 or another suitable number of blade elements 180. In a representative embodiment, the number and sizing of the blade elements 180 is such that only a small (e.g., minimal) amount of airflow may be lost—most of the airflow can contribute to rotation because of the large amount of blade surface area to receive the airflow. The hub 170 can be attached to the generator 150 via a rotatable shaft 310 that transfers rotation from the turbine 140 to the generator 150.

In a representative embodiment of a turbine 140 in accordance with the present technology, blade elements 180 can form a center-focused turbine 140. For example, the blade elements 180 can be curved toward the airflow and each blade element 180 can overlap another blade element 180. Each blade element can include a root portion having a length between leading and trailing edges of approximately 8 inches and a smaller tip portion having a length between leading and trailing edges of approximately 6.7 inches, along with an overall length from root to tip of approximately 14.58 inches, for example. In other embodiments of the technology, other suitable turbines or blade dimensions can be used.

Figure 4:
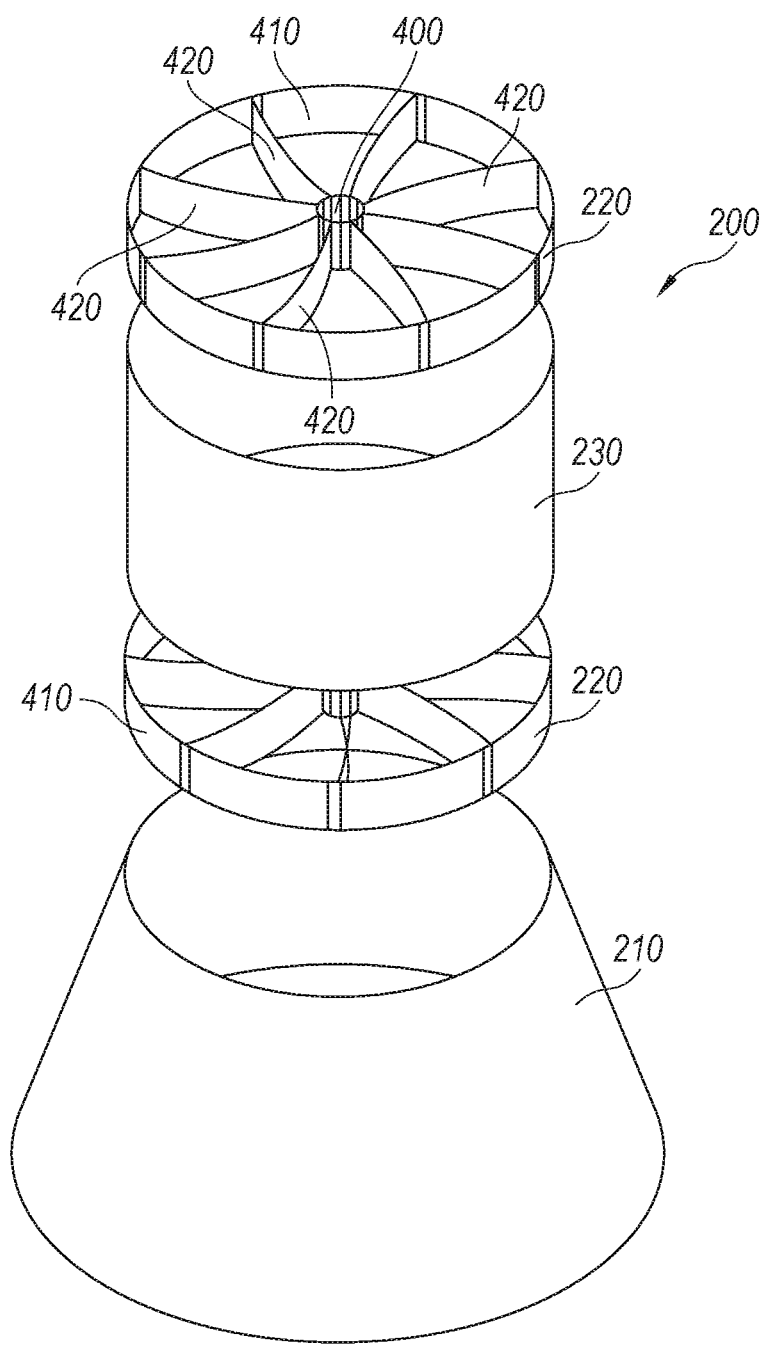
FIG. 4 illustrates an exploded view of a flow control assembly shown in FIG. 2.

FIG. 4 illustrates an exploded, isometric view of the flow control assembly 200 shown in FIG. 2. The one or more baffle elements 220 (for example, two baffle elements 220) can be positioned in or attached to the cone cap 230. The baffle elements 220 reduce swirling in the airflow prior to the airflow reaching the turbine 140. Such reduction in swirling can increase efficiency of the rooftop exhaust collector and electrical energy generator assembly 100. Each baffle element 220 can include an inner ring 400, an outer ring 410, and one or more strip elements 420 connected between the inner ring 400 and the outer ring 410. Inner ring 400 and outer ring 410 can be square, rectangular, or other suitable shapes to accommodate other shapes of the housing 130.

In a representative embodiment, the strip elements 420 can be curved between the inner ring 400 and the outer ring 410. The strip elements 420 and the baffle elements 220 themselves can be sufficiently spaced apart to avoid slowing the airflow, and in some embodiments, the baffle elements 220 may be rotated to be offset relative to each other about their respective axes by a number of degrees. For example, if there are eight strip elements segmenting the space into eight openings, with each opening representing 45 degrees, the two baffles can be offset half of that, for an offset of 22.5 degrees relative to each other.

The inner ring 400 can have any suitable dimensions, such as, for example, a height of three inches, an outer diameter of 2.526 inches, and a wall thickness of 0.01 inches. The outer ring 410 can have any suitable dimensions, such as, for example, a height of three inches, an outer diameter of 22.48 inches, and a wall thickness of 0.04 inches. The strip elements can be approximately 3 inches tall and 9.9 inches long, and they can have a curvature with a radius of approximately 23 inches. In other embodiments, the baffle elements 220 can have other suitable dimensions. In further embodiments, the baffle elements 220 can include one or more parallel channels in a grid, a mesh material, or another suitable structure for reducing rotation in airflow (for example, the grid structure 725 described below with respect to FIG. 7 may be used in place of or in addition to one of the other baffle elements 220 described herein).

Figure 5:
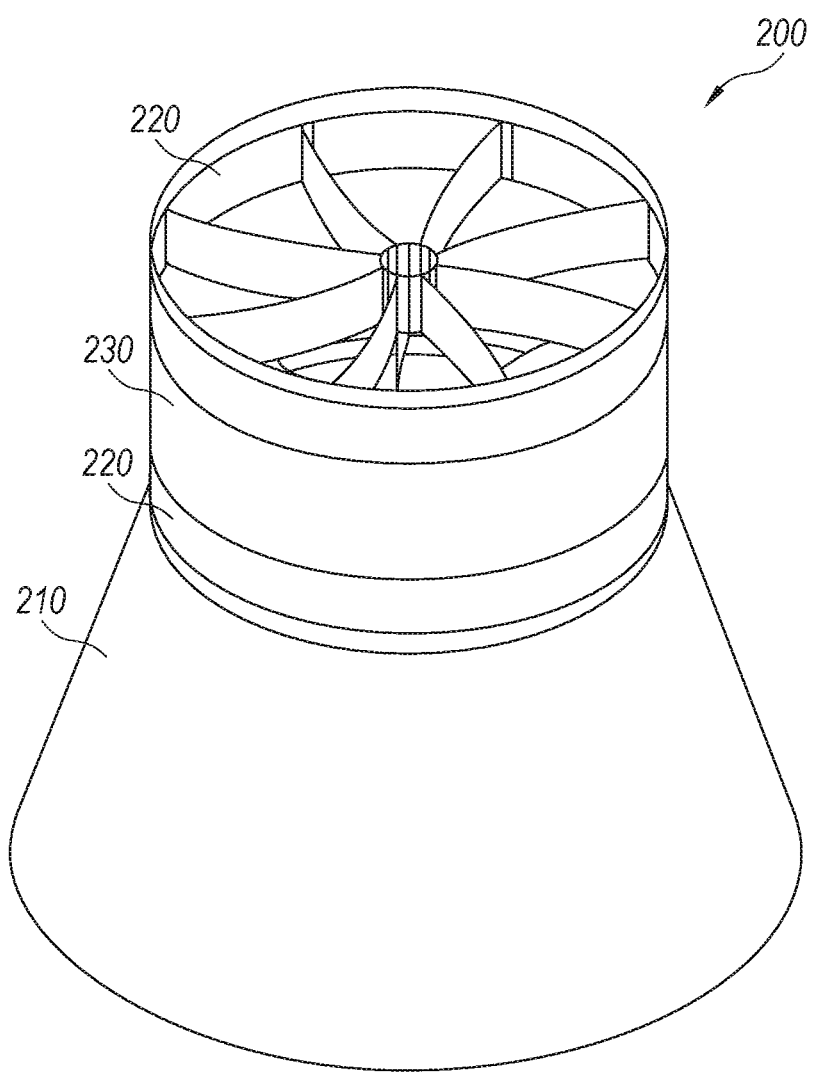
FIG. 5 illustrates a view of the flow control assembly shown in FIG. 2.

FIG. 5 illustrates a view of the assembled flow control assembly 200 shown in FIG. 2. As described above, in some embodiments, the baffle elements 220 can be positioned inside the cone cap 230. For example, in a representative embodiment, each baffle element 220 can be positioned inside the cone cap 230 at a distance of one inch from a corresponding edge of the cone cap 230. In some embodiments, two baffle elements 220 may be six inches apart from one another. In further embodiments, the baffle elements 220 can be stackable and arranged above and below the cone cap 230. In some embodiments, the flow control assembly 200 can have an overall height that is approximately ¾ of the height of the housing 130 (FIG. 2).

Figure 6:
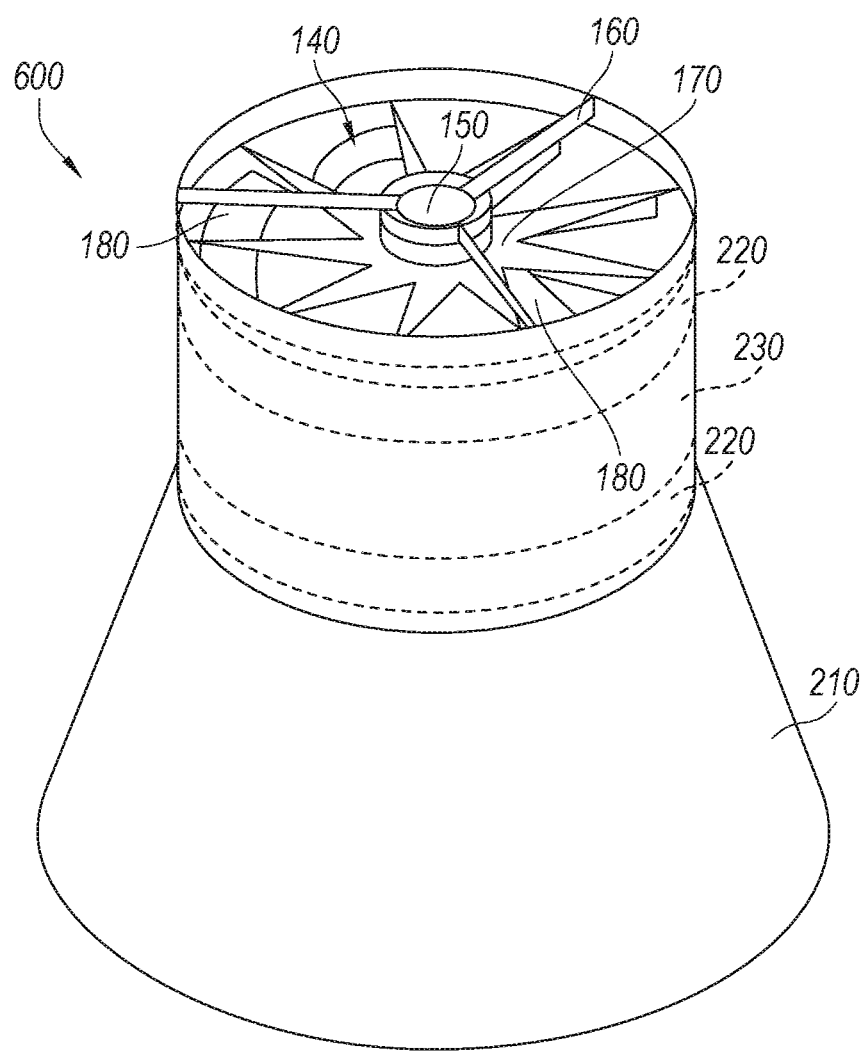
FIG. 6 illustrates a rooftop exhaust collector and electrical energy generator assembly in accordance with another representative embodiment of the present technology.

FIG. 6 illustrates a rooftop exhaust collector and electrical energy generator assembly 600 (also referred to hereafter for convenience as a rooftop exhaust collector 600) in accordance with another representative embodiment of the present technology. Such a rooftop exhaust collector 600 may not have an outer housing (such as the housing 130 in FIGS. 2 and 3). Rather, in such embodiments, the Venturi element 210 (described above with respect to FIGS. 1-5) can support the cone cap 230 and the support structure 160, which can support the turbine 140 and the generator 150. Such an embodiment uses the Venturi element 210 to increase the speed of the air received into the assembly 600 in a manner similar to other embodiments disclosed herein. The rooftop exhaust collector 600 may optionally (but need not) pass the airflow through one or more baffle elements 220 (described above in additional detail with respect to FIGS. 2, 5, and 6) to straighten the airflow before the air reaches the turbine 140. The turbine 140 may be a center-focused turbine as described above with respect to FIG. 3, or it may be a standard turbine or another turbine suitable for driving the generator 150.

Figure 7:
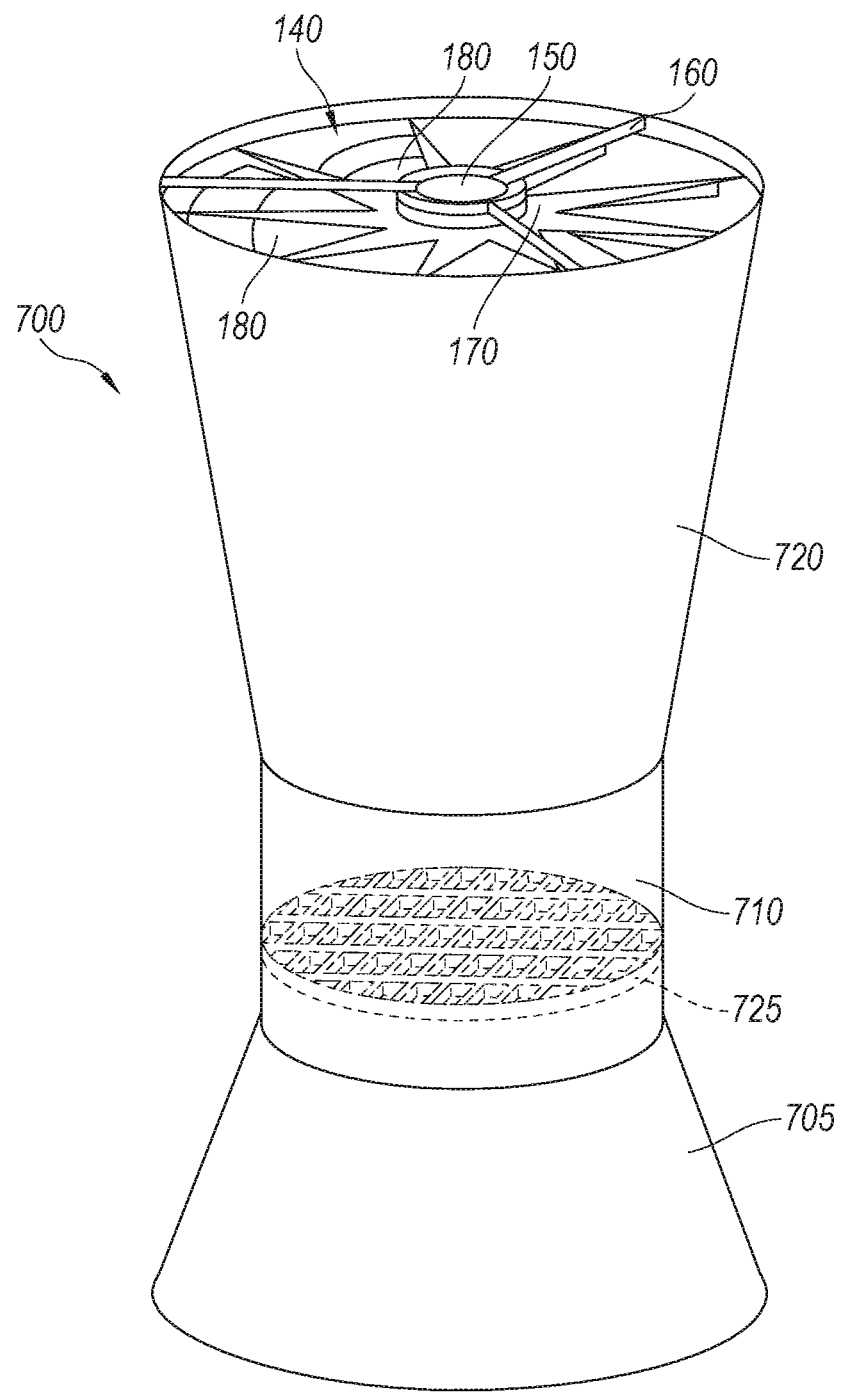
FIG. 7 illustrates a rooftop exhaust collector and electrical energy generator assembly in accordance with another representative embodiment of the present technology.

FIG. 7 illustrates a rooftop exhaust collector and electrical energy generator assembly 700 (also referred to hereafter for convenience as a rooftop exhaust collector 700) in accordance with another representative embodiment of the present technology. Such an embodiment includes a base Venturi element 705 (similar to the Venturi element 210 described above with respect to FIGS. 1-6), which supports a throat or flow control cylinder 710, which in turn supports an expansion cone 720. The turbine 140 and generator 150 can be supported by a support structure 160 mounted on or within the expansion cone 720. The rooftop exhaust collector 700 uses the Venturi element 705 to increase the speed of the air received into the assembly 700 (such as from one or more exhaust fans 120, FIG. 1) similar to other embodiments disclosed herein. The rooftop exhaust collector 700 passes the airflow through the flow control cylinder 710, which may optionally (but need not) include one or more baffle elements (such as the baffle elements 220 described above with respect to FIGS. 2, 5, and 6) to straighten the airflow before the air reaches the turbine 140. For example, in a representative embodiment, a baffle element may be in the form of a grid structure 725 positioned within the flow control cylinder 710. Such a grid structure 725 may be a disk-like element having square or rounded channels aligned along the direction of the airflow, or it may be a structure having a mesh and/or a screen. There may optionally be one or more vents (for example, four vents, not shown) positioned around the circumference of the flow control cylinder 710 to control pressure inside the flow control cylinder 710, or the vents may be positioned in other suitable locations to reduce backpressure in the rooftop exhaust collector 700.

The turbine 140 may be a center-focused turbine or it may be a standard turbine or another turbine suitable for driving the generator 150 (for example, a "whirlybird" type turbine"). The expansion cone 720 can be sized to accommodate a variety of turbine diameters. In some embodiments, an inner diameter of the flow control cylinder 710 can be one-half of the maximum inner diameter of the Venturi element 705. In a representative embodiment, the flow control cylinder 710 can have a length of 18 inches and an inner diameter of 18 inches. And in such a representative embodiment, the Venturi element 705 can have a maximum inner diameter of 36 inches and a length along its central axis of 24.65 inches. The expansion cone 720 can have a maximum inner diameter of 24.3 inches and a length along its axis of 30 inches. In other embodiments, the expansion cone 720, the Venturi element 705, and the flow control cylinder 710 can have other suitable dimensions. For example, in some embodiments, the Venturi element 705 can be taller and/or longer along its central axis than the expansion cone 720 along its respective axis. In some embodiments, the Venturi element 705 can have a larger internal volume than the expansion cone 720 and/or the flow control cylinder 710.

Figure 8:
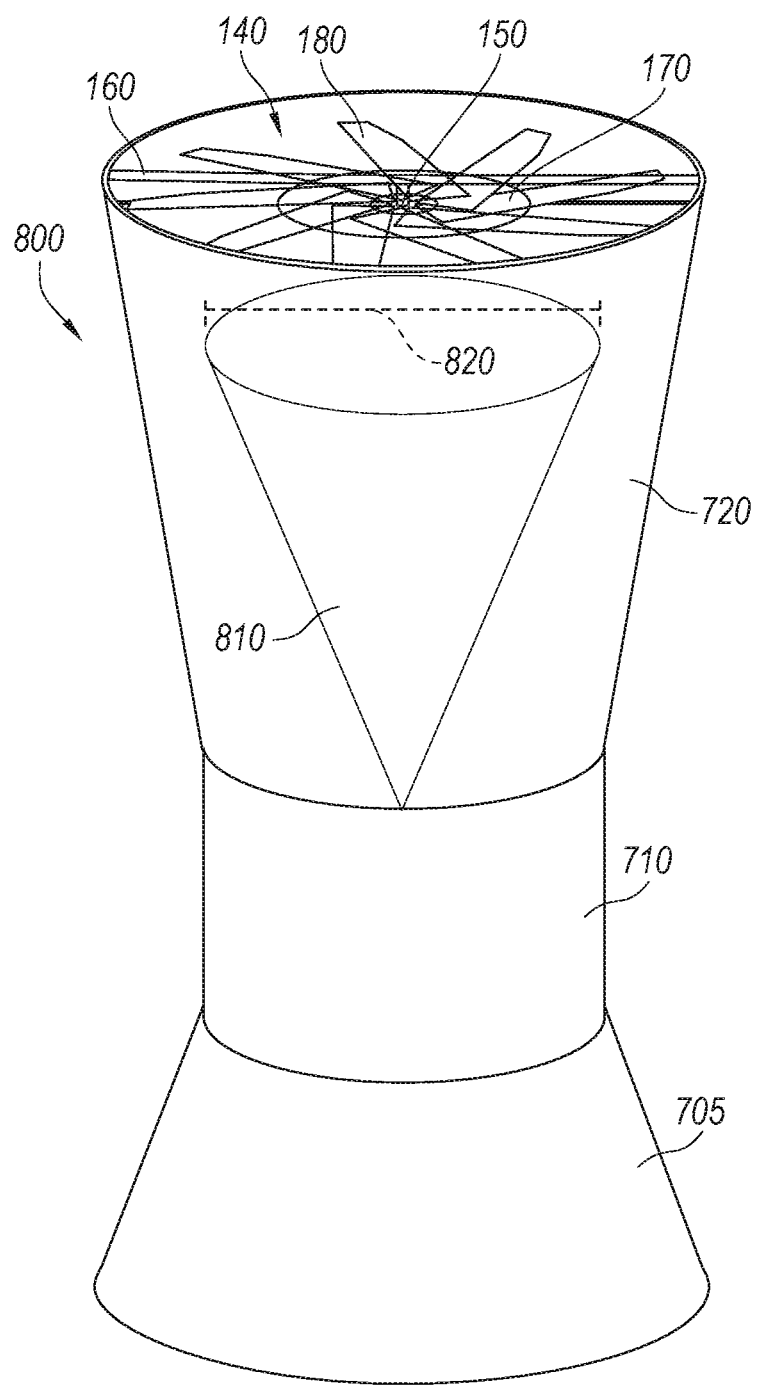
FIG. 8 illustrates a rooftop exhaust collector and electrical energy generator assembly in accordance with another representative embodiment of the present technology.

FIG. 8 illustrates a rooftop exhaust collector and electrical energy generator assembly 800 (also referred to hereafter for convenience as a rooftop exhaust collector 800) in accordance with another representative embodiment of the present technology. The rooftop exhaust collector 800 is generally similar to the rooftop exhaust collector 700 described above with respect to FIG. 7. In addition, the rooftop exhaust collector 800 includes a diverter cone 810 (in the form of a diverging cone or frustum, for example) positioned inside the expansion cone 720 to direct the airflow outwardly for edge-focused turbines 140 (those that are more efficient about their circumference rather than towards their centers) or other suitable turbines.

The diverter cone 810 can be suitably supported within the expansion cone 720 by one or more suitable supports connected to the expansion cone 720 and/or the flow control cylinder 710 (supports not shown, but can include arms, bolts, beams, straps, or other suitable supports to hold the diverter cone 810 in place). The diverter cone 810 can have a suitable maximum base diameter 820 to direct the airflow to the most effective portion of the turbine 140, depending on the specific design of the turbine 140 and/or the blade elements 180 (i.e., where airflow to the turbine 140 results in the most efficient conversion of airflow to rotation of the turbine 140). The diverter cone 810 can have its own Venturi effect or other suitable effect to increase speed of the airflow to the turbine 140. Baffle elements (not shown, but could include a baffle element 220 described above or, more particularly, the grid structure 725 described above) may be incorporated into the assembly 800 to straighten the airflow similar to other structures for straightening the airflow described above. In a further embodiment, the Venturi element 705 and the flow control cylinder 710 can be omitted, while the expansion cone 720 (with diverter cone 810) can serve to accelerate and/or guide airflow to the turbine 140. In still further embodiments, the expansion cone 720 may be straight (for example, in the assembly 800 described with respect to FIG. 8 and/or the assembly 700 described with respect to FIG. 7).

Figure 9:
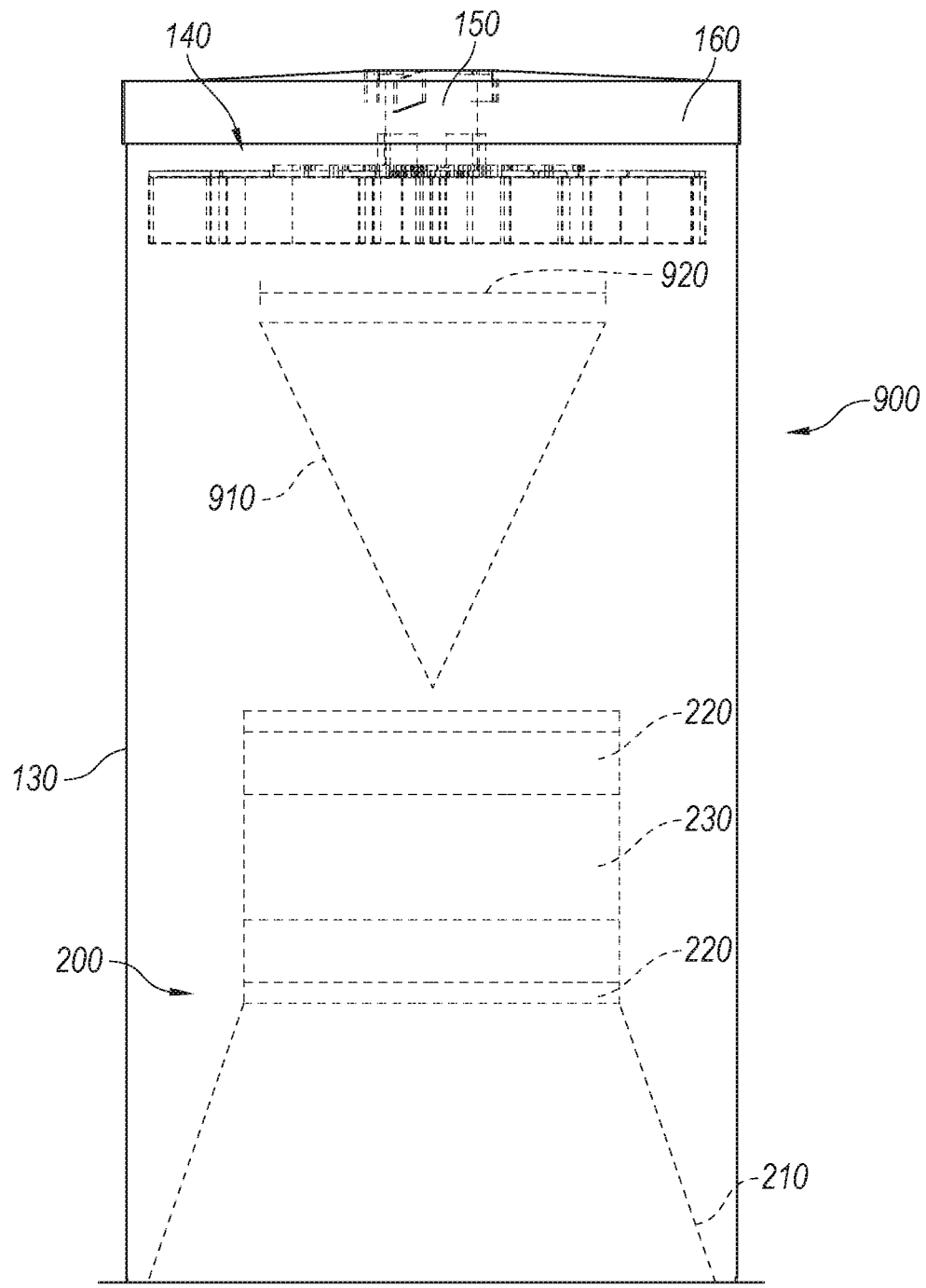
FIG. 9 illustrates a side cutaway view of a rooftop exhaust collector and electrical energy generator assembly in accordance with another representative embodiment of the present technology.

FIG. 9 illustrates a cutaway view of a rooftop exhaust collector and electrical energy generator assembly 900 (also referred to hereafter for convenience as a rooftop exhaust collector 900) in accordance with another representative embodiment of the present technology. The rooftop exhaust collector 900 is generally similar to the rooftop exhaust collector 100 described above with respect to FIG. 2. In addition, the rooftop exhaust collector 900 includes a diverter cone 910 (in the form of a diverging cone or frustum, for example) positioned inside the housing 130 between the flow control assembly 200 and the turbine 140 to direct the airflow outwardly for edge-focused turbines 140 or other suitable turbines. The diverter cone 910 can be suitably supported within the housing 130 by one or more suitable supports connected to the housing 130 and/or the flow control assembly 200 (supports not shown, but can include arms, bolts, beams, straps, or other suitable supports to hold the diverter cone 910 in place). The diverter cone 910 can have a suitable maximum base diameter 920 to direct the airflow to the most effective portion of the turbine 140, depending on the specific design of the turbine 140 and/or the blade elements of the turbine 140 (i.e., where airflow to the turbine 140 results in the most efficient conversion of airflow to rotation of the turbine 140).

Note that although a cone or frustum may be used to form the diverter cones 810, 910 described above, the diverter cones 810, 910 need not be formed from a single structure and may optionally be formed from one or more plates connected together or at least positioned near each other to direct air as necessary toward the efficient portions of the turbine 140. For example, four plates may approximate a diverging shape similar to one of the diverter cones 810, 910.

Figure 10:
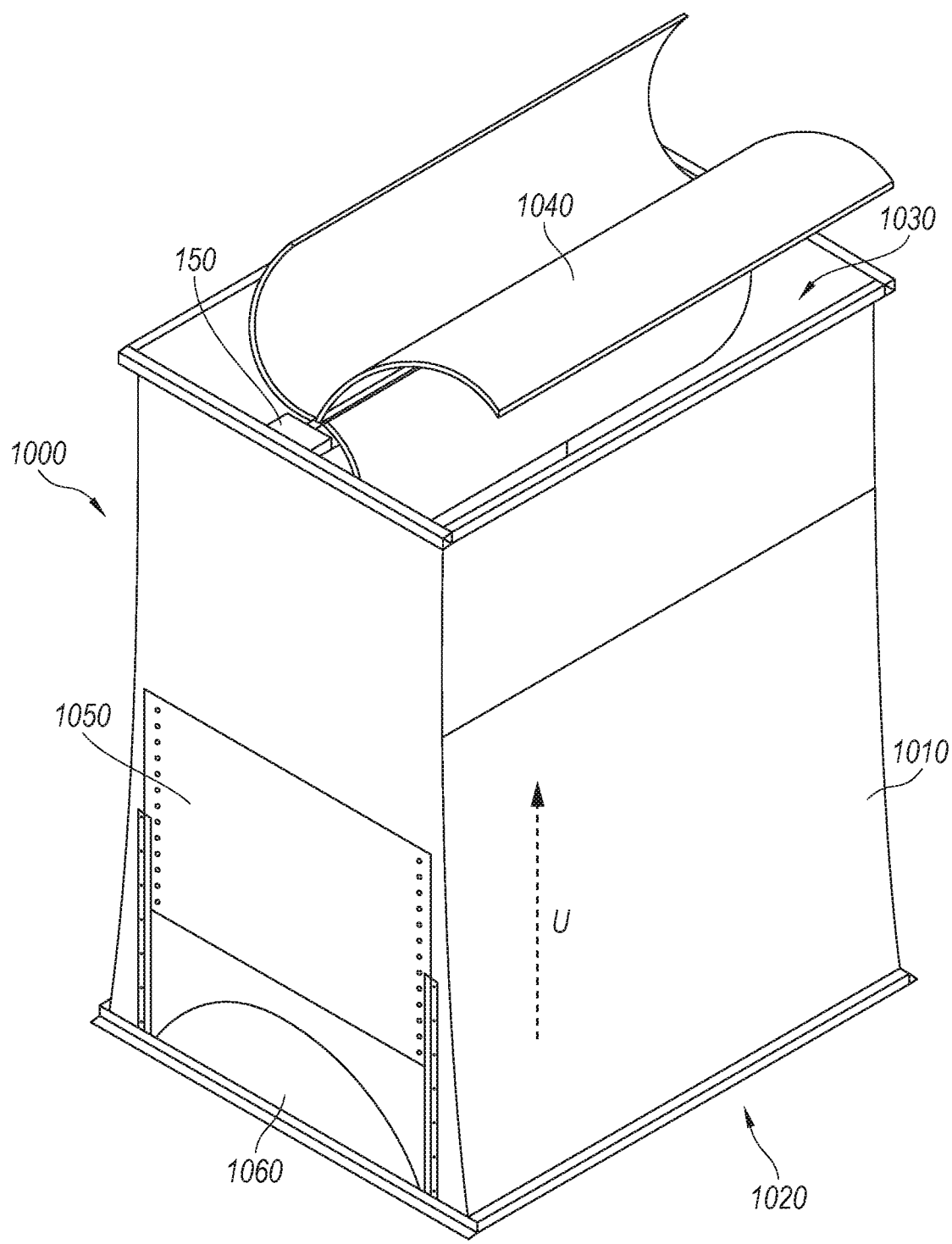
FIG. 10 illustrates an isometric view of a rooftop exhaust collector and electrical energy generator assembly in accordance with another representative embodiment of the present technology.

FIG. 10 illustrates a partially-schematic isometric view of a rooftop exhaust collector and electrical energy generator assembly 1000 (also referred to hereafter for convenience as a rooftop exhaust collector 1000) in accordance with another representative embodiment of the present technology. An enclosed passageway or contoured duct 1010 may have a rectangular cross-section with a suitable contoured profile for increasing a speed of airflow from a lower end 1020 of the duct 1010 toward an upper end 1030. For example, the contoured duct 1010 may be contoured to use the Venturi effect to increase the speed of the airflow at the upper end 1030 in a similar manner as other embodiments described herein. A Savonius turbine 1040 or other suitable turbine is positioned in or near the upper end 1030 to receive the airflow after the contoured duct 1010 has increased airflow velocity along the direction labeled "U" in FIG. 10. The Savonius turbine 1040 can operate a generator (such as the generator 150 described above with respect to FIGS. 1-3 and 6-9) to create electrical energy from the airflow received in the lower end 1020. In some embodiments, backpressure against the source of the airflow providing air to the lower end 1020 can be relieved using an adjustable sliding door 1050 positioned to cover and uncover an opening 1060. The door 1050 need not be a sliding door, rather, it can be any suitable removable and/or adjustable cover for the opening 1060. The opening 1060 can be positioned in any suitable location on the duct 1010, for example on a narrow end of the duct 1010 near the lower end 1020 as illustrated in FIG. 10, or on a wide end of the duct 1010 (not shown).

In a further representative embodiment (not shown), the Savonius turbine 1040 and the generator 150 can be replaced with an expansion cone, turbine, and generator similar to the expansion cone 720, turbine 140, and generator 150 described above with respect to FIG. 7.

Rooftop exhaust collector and electrical energy generator assemblies in accordance with embodiments of the present technology may be formed using steel (such as galvanized steel), aluminum, or other suitable metals or metal alloys. They may also be made with composite materials, polymers, wood, or other suitable materials.

The technology disclosed herein provides several assemblies for capturing wasted airflow exhausted from buildings or other structures and using that airflow to generate electricity via a turbine and generator. The inventor discovered that the present technology can accelerate such wasted airflow using a converging or Venturi-type cone and generate electricity via a turbine and generator. The inventor also discovered that backpressure against the vent or fan (for example, the fan 120 described with respect to FIG. 1) can be minimized or eliminated to generate a net positive amount of electrical energy. For example, the backpressure region 260 and/or the backpressure vent 270 described above with respect to FIG. 2 improve efficiency of a turbine and generator arrangement according to embodiments of the present technology. And baffles (for example, the baffle elements 220 described above with respect to FIG. 2) further increase efficiency by straightening the air from the source (such as the fan 120). Recent testing to determine effectiveness and efficiency has revealed that the energy generated by the technology can be as much as 30% of the energy spent powering an exhaust fan (120).

The electrical energy generated by embodiments of the technology can be used in microgrid arrangements of electrical power grids. Such energy can be stored locally, such as in a building or other facility, to provide at least some energy independence. Such energy independence can save electrical costs, provide for a secure backup in case of emergency, and/or provide for supplemental power during times when energy costs are high (such as times of peak demand). One or more control systems can be implemented to monitor, regulate, store, and distribute the energy.

Accordingly, as disclosed herein, representative embodiments of the present technology increase the speed of an artificial airflow using the Venturi effect and/or other fluid dynamics principles, optionally straighten the airflow using one or more baffles, direct the air towards a turbine and generator for generation of electrical energy, and optionally allow room for backpressure and turbulence to dissipate.

From the foregoing, it will be appreciated that specific embodiments of the disclosed technology have been described for purposes of illustration, but that various modifications may be made without deviating from the technology, and elements of certain embodiments may be interchanged with those of other embodiments. For example, in some embodiments, rooftop exhaust collector and electrical energy generator assemblies can be positioned in a horizontal orientation to receive vented air from a side orientation (they need not operate vertically). In other embodiments, various types of turbines and blade arrangements can be used. In still further embodiments, various baffle elements and numbers of baffle elements can be used. Embodiments in accordance with the technology can be scaled up or down to suitably correspond to the size of the source vent or fan. When scaling up or down, dimensions of various embodiments of the technology can maintain ratios relative to each other, or they may use other suitable dimensions. In further embodiments, turbines (such as turbine 140 described above) can be center-focused, Savonius-type, radially-outward-focused turbines, or any other suitable turbine for converting airflow to rotation to operate a generator.

Further, while advantages associated with certain embodiments of the disclosed technology have been described in the context of those embodiments, other embodiments may also exhibit such advantages, and not all embodiments need necessarily exhibit such advantages to fall within the scope of the technology. Accordingly, the disclosure and associated technology may encompass other embodiments not expressly shown or described herein, and the invention is not limited except as by the appended claims.

What is claimed is:

1. An electrical energy generation system comprising:
   a cylindrical housing having an upper housing end and a lower housing end;
   an electrical generator supported by the housing near the upper housing end;
   a turbine operatively connected to the electrical generator; and
   a converging channel positioned within the housing and having an upper channel end and a lower channel end, an upper channel opening positioned in the upper channel end, and a lower channel opening positioned in the lower channel end; wherein
   a width of the upper channel opening is less than a width of the lower channel opening,
   the width of the lower channel opening is less than an inner diameter of the cylindrical housing,
   the upper channel end is positioned between the lower housing end and the upper housing end and spaced apart from the cylindrical housing, and wherein
   the converging channel is configured to increase a speed of moving air received in the lower channel opening and direct the moving air out of the upper channel opening, into the housing, and then toward the turbine; and
   wherein the converging channel is coaxially aligned with the housing.

2. The electrical energy generation system of claim 1 wherein the converging channel comprises a frustum.

3. The electrical energy generation system of claim 1, further
   comprising a diverging element configured to cause the airflow to diverge between the converging channel and the turbine to direct the airflow toward an outer annular region of the turbine.

4. The electrical energy generation system of claim 1, further comprising a baffle element attached to the converging channel, wherein the baffle element is configured to cause the moving air to move along a pathway that is generally parallel with a rotational axis of the turbine.

5. The electrical energy generation system of claim 4 wherein the baffle element is positioned in a hollow cap element attached to the converging channel.

6. The electrical energy generation system of claim 5 wherein the baffle element is a first baffle element, and wherein the system further comprises a second baffle element positioned in the hollow cap element and spaced apart from the first baffle element.

7. The electrical energy generation system of claim 4 wherein the baffle element comprises a plurality of parallel channels.

8. The electrical energy generation system of claim 1, further comprising a relief vent positioned to open and close an airway between an interior of the housing and an exterior of the housing.

9. The electrical energy generation system of claim 8, further comprising
a control system configured to cause the relief vent to open or close based on a pressure differential between the interior of the housing and the exterior of the housing.

10. The electrical energy generation system of claim 1, further comprising an artificial airflow source, the artificial airflow source comprising at least one of an exhaust fan, an exhaust vent, or a chimney.

* * * * *